United States Patent
Aarestrup

(10) Patent No.: US 7,859,211 B2
(45) Date of Patent: Dec. 28, 2010

(54) METHOD FOR CONTROLLING THE FIRING ANGLE OF AN ELECTRIC MOTOR

(75) Inventor: Jan Caroe Aarestrup, Bjerringbro (DK)

(73) Assignee: Grundfos a/s, Bjerringbro (DK)

( * ) Notice: Subject to any disclaimer, the term of this patent is extended or adjusted under 35 U.S.C. 154(b) by 0 days.

(21) Appl. No.: 11/655,805

(22) Filed: Jan. 19, 2007

(65) Prior Publication Data

US 2007/0114957 A1    May 24, 2007

Related U.S. Application Data

(63) Continuation of application No. 11/185,308, filed on Jul. 20, 2005, now Pat. No. 7,166,974, which is a continuation of application No. PCT/EP2004/000281, filed on Jan. 16, 2004.

(30) Foreign Application Priority Data

Jan. 21, 2003  (EP)  ................................. 03001162

(51) Int. Cl.
   *H02P 6/18*    (2006.01)
(52) U.S. Cl. ............................. 318/400.3; 318/400.34; 318/400.35
(58) Field of Classification Search ................. 318/700, 318/400.01, 400.3, 400.32, 400.34, 400.35, 318/400.42

See application file for complete search history.

(56) References Cited

U.S. PATENT DOCUMENTS

| 3,470,436 | A |   | 9/1969  | Steele |
| 3,596,158 | A | * | 7/1971  | Watrous ...................... 318/809 |
| 3,611,081 | A | * | 10/1971 | Watson ................... 318/400.35 |
| 4,278,921 | A | * | 7/1981  | Medding et al. ........ 318/400.37 |
| 4,631,459 | A | * | 12/1986 | Fujioka et al. .......... 318/400.11 |
| 4,651,067 | A | * | 3/1987  | Ito et al. ................. 318/400.23 |
| 4,712,050 | A | * | 12/1987 | Nagasawa et al. ....... 318/400.04 |
| 4,743,815 | A | * | 5/1988  | Gee et al. .............. 318/400.11 |
| 4,769,581 | A |   | 9/1988  | Rilly |

(Continued)

FOREIGN PATENT DOCUMENTS

DE    19546145 A1    6/1996

(Continued)

OTHER PUBLICATIONS

Stephen J. Chapman, "Electric Machinery Fundamentals", third edition, McGraw-Hill Publishing, 1999, p. 274, example 5-2 shows phase relationship between the induced voltage and phase voltage of a generator.

(Continued)

*Primary Examiner*—Bentsu Ro
(74) *Attorney, Agent, or Firm*—Panitch Schwarze Belisario & Nadel LLP

(57) ABSTRACT

A method for controlling the firing angle of a single-phase AC powered electric motor is provided which is triggered by at least one locking electronic switch, such as a triac (T1 and T4) located between the distribution voltage ($U_V$) and at least one motor winding (A, B). According to said method, intervals are defined within which the triacs (T2 to T4) are to be fired according to the curve of the distribution voltage ($U_V$) and the voltage ($U_{EMK}$) induced in the respective winding in order to allow the motor to start as quickly and smoothly as possible and run quietly and at high efficiency.

18 Claims, 6 Drawing Sheets

U.S. PATENT DOCUMENTS

| | | | |
|---|---|---|---|
| 4,780,652 A | | 10/1988 | Rilly |
| 4,833,386 A | * | 5/1989 | Unsworth .................... 318/763 |
| 5,051,681 A | * | 9/1991 | Schwarz ..................... 318/786 |
| 5,130,620 A | * | 7/1992 | Inaji et al. .............. 318/400.35 |
| 5,245,256 A | * | 9/1993 | Cassat et al. ........... 318/400.35 |
| 5,254,914 A | * | 10/1993 | Dunfield et al. ........ 318/400.34 |
| 5,315,198 A | * | 5/1994 | Toroh ........................ 310/162 |
| 5,391,971 A | * | 2/1995 | Yamada et al. .............. 318/778 |
| 5,552,682 A | * | 9/1996 | Ushikoshi .............. 318/400.38 |
| 5,635,810 A | * | 6/1997 | Goel .......................... 318/719 |
| 5,640,073 A | * | 6/1997 | Ikeda et al. ............ 318/400.03 |
| 5,675,226 A | | 10/1997 | Riola |
| 5,708,337 A | * | 1/1998 | Breit et al. ............. 318/400.09 |
| 5,755,244 A | | 5/1998 | Sargeant et al. |
| 6,064,175 A | * | 5/2000 | Lee ............................. 318/809 |
| 6,081,092 A | | 6/2000 | Alvaro et al. |
| 6,114,827 A | | 9/2000 | Alvaro |
| 6,225,775 B1 | | 5/2001 | Alvaro et al. |
| 6,239,563 B1 | | 5/2001 | Kunz |
| 6,329,783 B1 | | 12/2001 | Vrionis et al. |
| 6,498,446 B1 | * | 12/2002 | Menegoli et al. ....... 318/400.12 |
| 6,885,161 B2 | | 4/2005 | de Nanclares et al. |

FOREIGN PATENT DOCUMENTS

EP    0872949 A2    10/1998

OTHER PUBLICATIONS

A Chinese Office Action for the corresponding Chinese Patent Application No. 200480002590.6; dated Mar. 23, 2007; 13 pages (including English translation).

A European Office Action for the corresponding European Patent Application No. 03 001 162.1; dated Apr. 2, 2007; 8 pages.

* cited by examiner

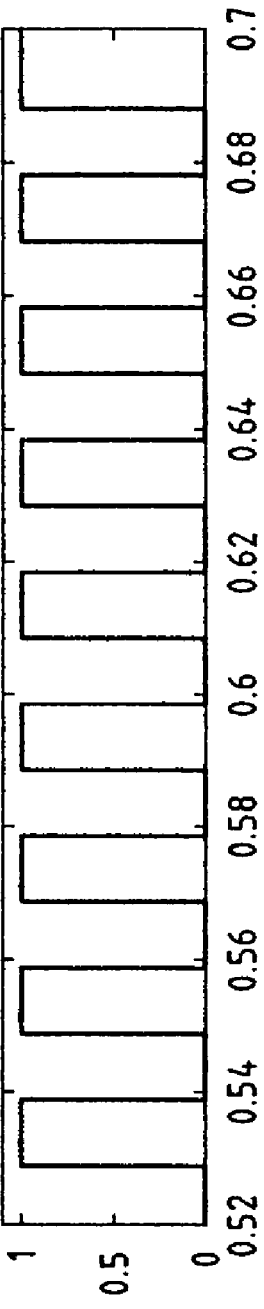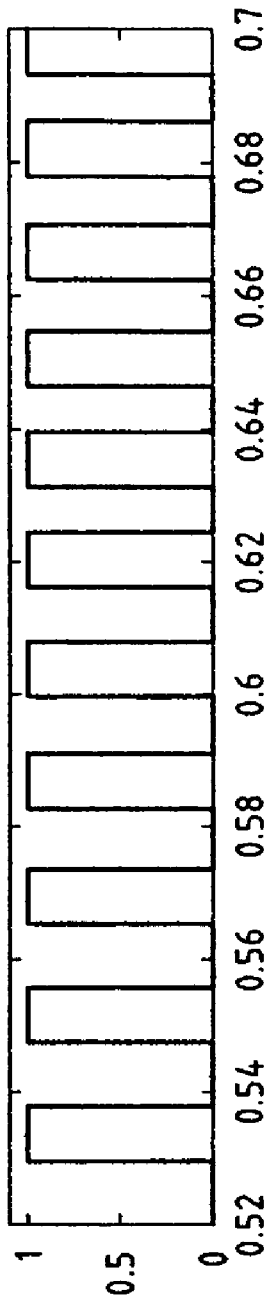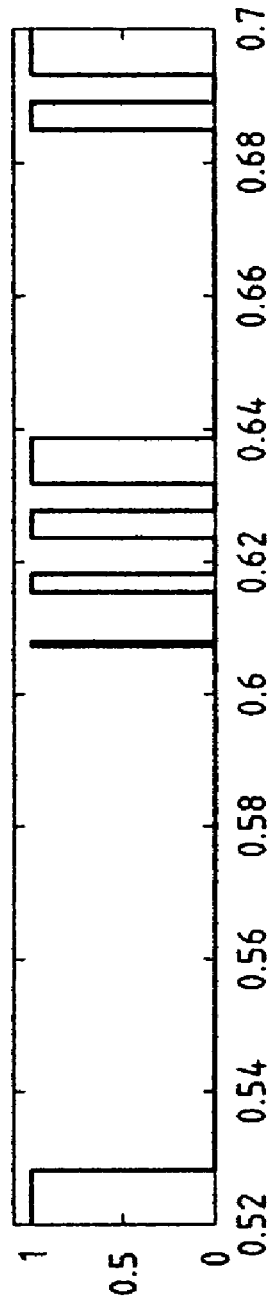
Fig. 3a
Fig. 3b
Fig. 3c

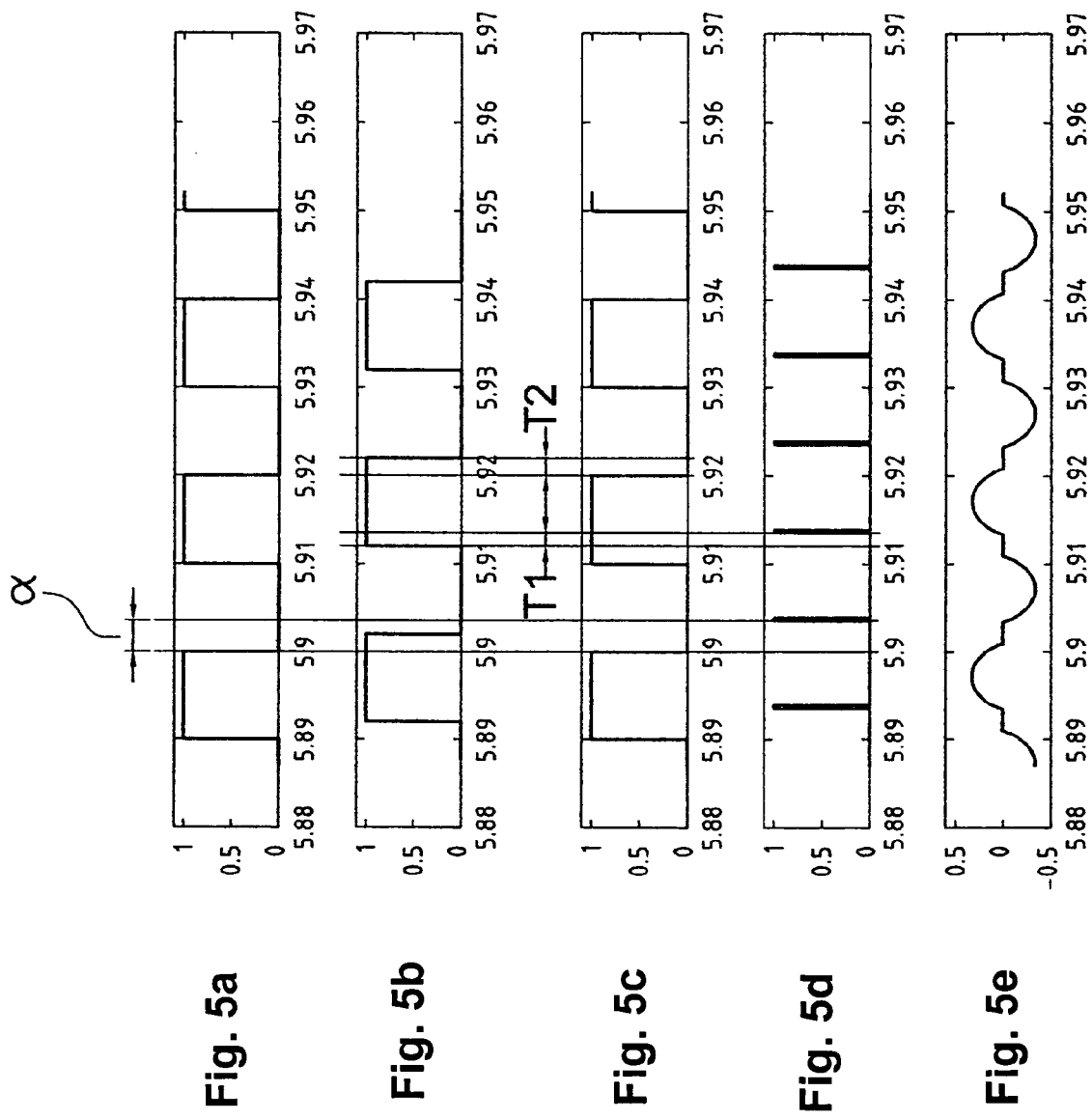

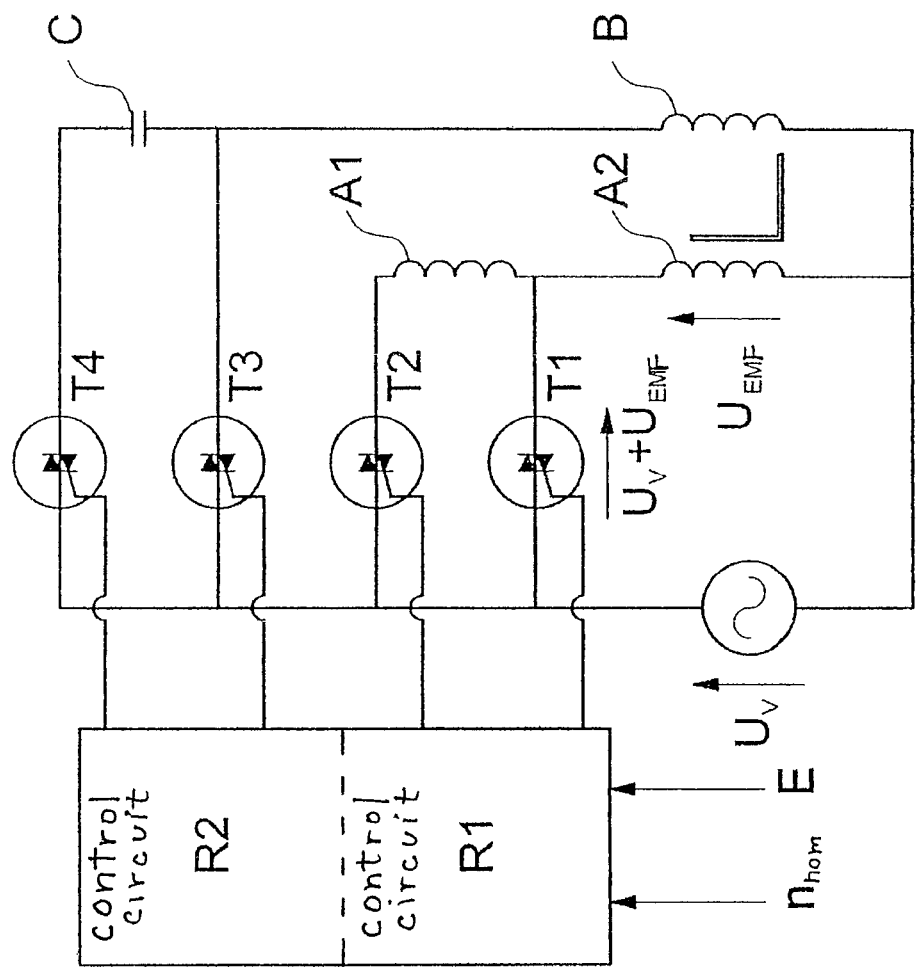

METHOD FOR CONTROLLING THE FIRING ANGLE OF AN ELECTRIC MOTOR

CROSS-REFERENCE TO RELATED APPLICATIONS

This application is a continuation of U.S. application Ser. No. 11/185,308 filed Jul. 20, 2005, now, U.S. Pat. No. 7,166,974, which, in turn, is a continuation of International Application No. PCT/EP2004/000281, filed Jan. 16, 2004, which was published in the German language on Aug. 5, 2004, under International Publication No. WO 2004/066484 A1. The disclosures of these prior applications are incorporated herein by reference.

BACKGROUND OF THE INVENTION

The invention relates to a method for controlling the firing angle of a single-phase electric motor supplied with alternating current.

Electric motors nowadays may be activated largely independently of the mains frequency by way of electronic controls. However, even with the application of highly integrated electronic circuits, converter electronics create costs which often lie in the magnitude of that of the motor. For this reason, and in particular for motors of a small and medium power of below 200 Watts for example, one strives to provide controls which may be manufactured in a more economical manner and which operate the motor in a highly effective manner, i.e. at a high efficiency. In particular, permanent magnet motors which are provided with activation electronics constructed from triacs as power switches are suitable for this on account of their high efficiency. Such triacs which are allocated as switches to the individual motor windings have the advantage that they may be manufactured in an inexpensive manner, but have the disadvantage that with the usual activation it is the case of locking switches, i.e. which after switching on only block again when the current flowing through the switch becomes zero or changes its direction.

A method for the activation of a brushless electric motor by way of triacs is known from DE 35 07 883 A1 with which the mains voltage is connected to the part windings of the stator winding by way of phase-angle control such that one may also activate rotational speeds below the synchronous speed, but only certain rotational speeds which may not be freely selected.

A method for controlling a brushless electric motor is known from DE 35 17 570 A1, which likewise by way of triacs temporarily applies the mains voltage to the oppositely directed part windings of the motor winding, so that the motor may be activated at rotational speeds which lie above the synchronous speed by way of the production of opposing magnet poles. By way of this, the rotational speed may assume a multiple value of the synchronous speed, but only integer multiples of the synchronous speed.

It is thus known to activate an AC-supplied electric motor by way of triacs such that this may not only be operated synchronously, but supersynchronously and subsynchronously. As such, a further field of application opens up also to single-phase electric motors supplied with alternating current, which until now were only able to be controlled in rotational speed by way of extensive converter electronics.

However, phase-angle control as such is not sufficient in order to achieve a reliable start, a smooth running and a high efficiency on operation, and finally in order to avoid the magnets of the rotor becoming damaged due to an unallowably high magnetic field of the stator. This problem is described in DE 195 34 423 A1. For solving this problem, it is suggested there to provide a sensor for measuring the magnetic field of the rotor and with the help of phase-angle control to switch the alternating voltage to the stator winding of the motor depending on the magnetic field sensor signal, such that a moment is produced in the rotational direction. At the same time the current is limited in order not to produce any undesired high magnetic fields in the stator.

The disadvantage with this method is the fact that at least one magnetic field sensor is required for detecting the rotor position. Furthermore, the current limitation is achieved by way of measuring and integrating the currents and voltages and adapting them according to the rotor or the positions of the magnets.

BRIEF SUMMARY OF THE INVENTION

Against this background, it is the object of the invention to create a method for controlling the firing angle of a single-phase electric motor supplied with an alternating current, by way of at least one locking electronic switch between the mains supply and at least one motor winding, which with regard to control technology may be carried out with simple means and results in a reliable and quick start, as well as a smooth running at a constant, freely selectable rotational speed at a high efficiency. Furthermore, the method where possible is to be able to be realised without mechanical sensors on the motor.

According to the invention, the features specified in claim 1 achieve this object. Advantageous designs of the invention are specified in the dependent claims, the subsequent description as well as the drawing.

The basic concept of the present invention are the firing rules which are specified in claim 1 according to a) to f), which are applied selectively or preferably in combination and thus ensure a secure and optimised start and also permit the activation of the motor at almost any rotational speed in a simple manner, at a high efficiency and with a smooth running. The firing rules may be implemented by way of angular considerations or time measurements between the zero-crossings of the supply voltage and a variable corresponding to the rotor position and the rotor speed.

The method according to the invention presupposes in particular locking electronic switches, thus triacs for example, which are comparatively inexpensive, and at the same time in particular also takes account of the problems with regard to circuit technology (locking) which arise with regard to this context.

The sensor technology which is required for implementing the method may be purely electronic and thus may form a part of the control/regulation.

In order to ensure that the winding to be connected is not subjected to a voltage which produces a moment which opposes an intended rotational direction of the rotor, the voltage induced in the winding to be connected, thus the EMF (electromotive force) is to be evaluated and it is to be ensured that a connection of this winding is only effected when the supply voltage has the same polarity as the EMF (rule a).

At the same time a connection of this winding is preferably only effected when the voltage (EMF) induced in the winding to be connected not only has the same polarity as the supply voltage, but is also is smaller that this with regard to its magnitude (rule b).

The further essential firing rule lies in the fact that the winding to be connected is only subjected to the supply voltage within a predefined angular range calculated beginning from the zero-crossing of the induced voltage (EMF) in this winding, and specifically only when the induced voltage and the supply voltage have the same polarity (rule c).

A further essential firing rule finally lies in the fact that the connection of a winding is only effected when the zero-crossing of the supply voltage leads the zero-crossing of the voltage (EMF) induced in the winding to be connected, this latter zero-crossing being expected next based on the history of the course of the signal of the EMF, given the same change in polarity. This means that a connection of the winding is only effected when the zero-crossing of the EMF signal from plus to minus lags the zero-crossing of the supply voltage from plus to minus or from minus to plus when the zero-crossings which are offset in each case by 180° are considered. Since this firing rule may only be determined in an exact manner when the point in time of firing which is given according to this firing rule has already past, for a practical application one must determine the respective zero-crossing which is to be expected next from the history of the EMF signal, in order to be able to apply the rule in a practical manner at all. It is evident that the accuracy with which the expected zero-crossing of the EMF signal may be evaluated becomes higher, the more the rotational speed approximates a constant rotational speed. This firing rule is thus in particular advantageously applicable for the activation at a constant rotational speed (rule d).

The previously mentioned firing rule may be specified further in that a firing, i.e. connection of the triac for the conductive connection of the supply voltage to the winding to be connected is only effected when the angle between the voltage (EMF) induced in the winding to be connected and the supply voltage assumes a predefined value. This firing rule is also particularly advantageous for the activation at a constant rotational speed (rule e), where no acceleration excess is required, thus the firing range resulting according to the rule d does not need to be fully exploited.

Alternatively the switching point in time is preferably selected such that the angle between the point in time when the current in the winding to be connected assumes zero up to the point in time in which the induced voltage in this winding has assumed the value zero corresponds to the angle or the factor of this angle which preferably is between 0.5 and 2, which lies between the previous zero-crossing of the induced voltage and the current point in time of firing. This firing rule too is particularly advantageous for the activation at a constant rotational speed, and with regard to the signal course of the supply voltage effects a largely symmetrical connection of the respective winding (rule f). Rule f however in comparison to rule e demands a high computing capability.

On taking into account one or preferably more of the previously mentioned conditions, the motor is started in a rapid manner and is operated at any rotational speed with a good efficiency, and may be activated at any rotational speed by way of a [closed-loop] control circuit. Furthermore, the firing method according to the invention ensures a particularly smooth running of the motor which is particularly advantageous with the application in the field of heating circulation pumps, whose noise emissions are transmitted further through the pipe network in an almost undamped manner.

It is particularly advantageous if the angle according to firing rule e is selected depending on the rotational speed and separately for each phase, since the angle of the geometric offset to the other phases needs to be adapted.

Preferably, the firing rules c and d, according to which the connection of the winding is only effected when the voltage induced in the winding to be connected lies in a predefined angular range with respect to its zero-crossing, assuming the same polarity of the induced voltage and the supply voltage, as well as when the zero-crossing of the supply voltage lies in front of the expected zero-crossing of the voltage induced in the winding to be connected, assuming the same signal direction, are applied for the subsynchronous run-up (starting of the motor or acceleration in the subsynchronous range). For the supersynchronous run-up, i.e. the acceleration of the motor in the supersynchonous range to a desired supersynchronous rotational speed, it is however preferable to apply the firing rule d, since a temporary braking moment is prevented with this rule. Firing rule e is to be advantageously selected for the operation of the motor at a constant rotational speed, since then a particularly smooth and uniform running of the motor is ensured with a maximal efficiency.

Preferably with the method according to the invention, the voltage induced in a winding, in particular its zero-crossing is detected, and specifically when the supply voltage is disconnected. These values may alternatively be evaluated by calculation taking the rotor position into account.

With the method according to the invention, the detection of the readings, in particular the EMF in the winding separated from the mains may be effected with technically comparatively simple means in that one evaluates whether the winding is in the condition without current, and subsequently the EMF is determined by way of connecting a measurement means for measuring the voltage difference across the winding. The evaluation of the condition without current may be effected as is described below. One the one hand the zero-crossings are to be detected, which is not a problem with regard to measurement technology since one does not need to evaluate a specific value but only the change in polarity. According to a further formation of the invention it may however also be necessary for controlling the firing angle to detect the voltage induced in the winding to be connected in order to ascertain whether this with regard to magnitude is smaller than the supply voltage or not. This may be effected in a simple manner in that the voltage across the switch which connects or disconnects the winding to and from the mains supply and whose EMF is to be evaluated is measured. Since the mains voltage constantly prevails on the one side of this switch and on the other side the induced voltage (EMF) of the winding, with a measurement across the switch, the difference of the voltages always results, so that for the method according to the invention one only needs to effect an evaluation of this measurement with regard to polarity. This means that the voltages with regard to their magnitude doe not need to be detected at all, but only the polarity of the differential voltage resulting here, which is simple to evaluate with regard to measurement technology. The change in polarity here simultaneously represents the point in time when the winding current assumes the value zero.

Advantageously, according to the method according to the invention, not only are the zero-crossings of the induced voltages (EMF) in the windings, but also the zero-crossings of the supply voltage are determined and evaluated with regard to the point in time of firing. This embodiment which determines and evaluates the zero-crossings of the supply voltage and of the EMF, and the voltage across the switch in order to realise the firing rules, is based purely on time measurements and angular considerations without having to detect quantitative electrical variables. This construction is therefore particularly simple and robust.

On account of the relationships of the windings to one another which are geometrically fixed, the predefined angular range of the voltage (EMF) induced in the winding to be connected may be determined by determining the zero-crossing of the voltage induced in the other pole, and specifically when taking the geometric pole arrangement into account.

Therefore one does not need to constantly observe the EMF of the winding which is just to be switched, but any other winding may be used for evaluation whilst taking account of its angular position, inasmuch as it concerns the evaluation of the zero-crossings.

Instead of a signal detection of the EMF via a measurement in a winding separated from the mains supply, one may also provide for detection by sensor. In particular the zero-crossings of the EMF may be determined by a sensor detecting the rotor position and in a calculated manner. A Hall sensor or another electronic sensor may serve as a sensor. At the same time advantageously a separate sensor is allocated to each phase of the motor in a manner such that the polarity change of the magnetic field detected by the sensor corresponds to the zero-crossing of the voltage (EMF) induced in the winding to be connected. Specifically, with a suitable allocation one may use the sensor signal, at least inasmuch as it concerns the zero-crossing, since as far as this is concerned it corresponds to the EMF. One therefore requires no signal processing which takes account of the angle.

In order to be able to detect the EMF of a winding in the connected condition, one may detect the EMF in another winding which is not connected at this point in time, thus is not connected to the mains supply, wherein then a corresponding calculated phase-shifting is effected according to the geometric allocation of these two windings, so that an EMF signal results which represents the EMF in the connected winding.

The predefined angular range of the EMF in which the firing, i.e. the connection of the winding to the mains supply is to be effected, depends on the design of the motor. With a four-pole (four-phase) motor, the firing is effected preferably in the first 90° degrees of the EMF, assuming the same polarity of the induced voltage and the supply voltage.

In order to observe the predefined angular range in which the firing is to be effected according to rule c or d as precisely as possible, it is useful to carry out a corresponding time measurement in preferably the last half period of the voltage induced in the winding to be connected, in order to be able to predict the next expected zero-crossing of the EMF in an as reliable as possible manner and from this to determine the preferred firing angle range.

A corresponding single-phase electric motor supplied with alternating current with a permanent magnet motor comprises at least one winding which is arranged in the stator and which is subjected to the supply voltage by way of a locking electronic switch, in particular a triac. With such an arrangement, preferably at least one further locking electronic switch is provided to which a phase-shifting component may be connected. A triac is preferably likewise used as an electronic switch, wherein the phase-shifting component is preferably a capacitor. By way of this one may achieve a particularly smooth running of the motor if the capacitor is connected after the starting.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 1-5 shows in each case different signal courses by way of with which the firing rules are to be explained by way of example; and FIG. 6 shows a circuit diagram of a single-phase, two-pole electric motor supplied with alternating current.

DETAILED DESCRIPTION OF THE INVENTION

Figures 1A, 1B, 1C, 1D, 1E:
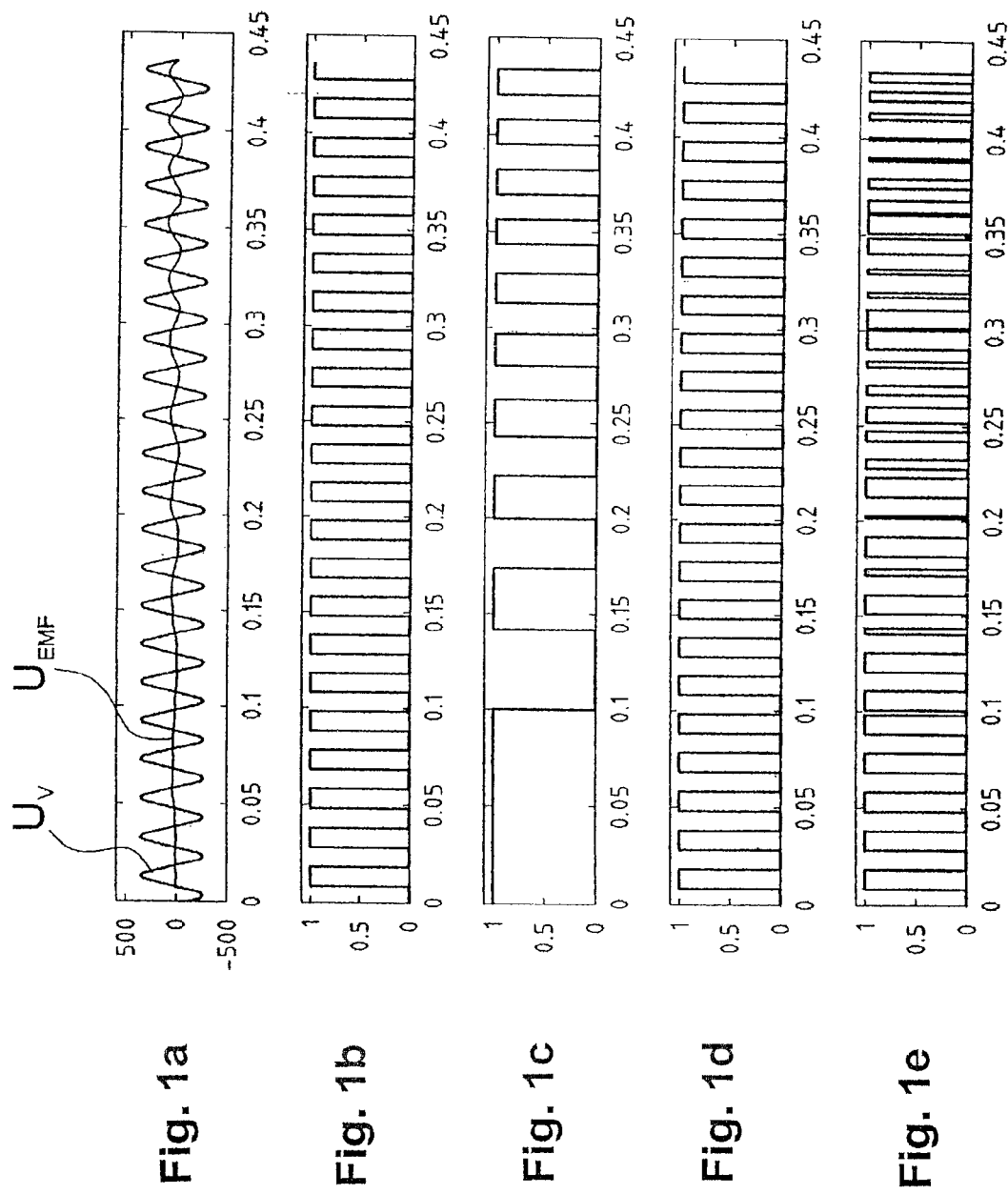

FIG. 1 in total shows five diagrams a, b, c, d and e, whose time axes run horizontally and correspond to one another. The temporal course of the supply voltage $U_V$ as well as the temporal course of the voltage $U_{EMF}$ induced in a winding are plotted in FIG. 1a. Whilst the supply voltage $U_V$ represents the common 50 Hz alternating voltage signal, the course of the induced voltage $U_{EMF}$ displays a typical starting behaviour. At the beginning of the rotation of the rotor, the voltage induced in the winding increases only gradually, and with this, the period corresponds to the reciprocal rotor speed. According to the firing rule a, the supply voltage $U_V$ is only to be connected to the winding when the voltage $U_{EMF}$ induced in this winding has the same polarity as the supply voltage $U_V$. The polarity of the supply voltage $U_V$ over its temporal course is represented in FIG. 1d, wherein the value zero corresponds to a negative polarity and the value 1 to a positive polarity. For the application of the first condition, specifically that the voltage $U_{EMF}$ induced in the winding to be connected has the same polarity as the supply voltage $U_V$, one only needs to determine when the curves according to FIGS. 1b and 1c match with regard to their values (0 or 1). This condition is then fulfilled.

As is to be deduced from FIG. 1d, here however firing rule b is also verified, specifically that the voltage $U_{EMF}$ induced in the winding to be connected and having the same polarity is smaller than supply voltage with regard to magnitude. For this, it is plotted in FIG. 1d when the latter is the case, specifically in the regions of the curve in which the curve assumes the value 1.

The switching times which result according to rule a and b are then shown by way of FIG. 1e. FIG. 1e represents when the signal of the curves 1b, 1c and 1d is simultaneously 1 or when one or more of these curves does not assume the value 1. FIG. 1e thus in the regions of the curve in which the value 1 is indicated, indicates the time intervals for connecting the winding which are possible according to the application of the rules a and b, i.e. for switching the triac for connecting the winding to the supply voltage supply. The time intervals in which the curves according to FIG. 1e has the value 1 of course only represent the possible switching times of the respective triac, the disconnection is effected automatically on account of the locking, and specifically when the winding current assumes the value zero. The disconnection times are thus neither indicated in this nor in the following diagrams, only the possible switching times.

Figure 2A:
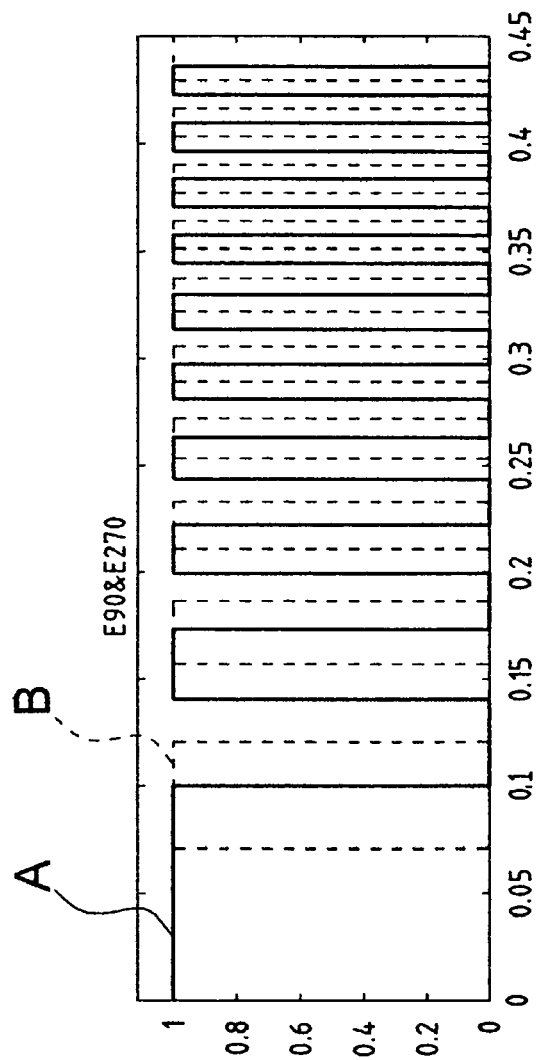
Figure 2B:
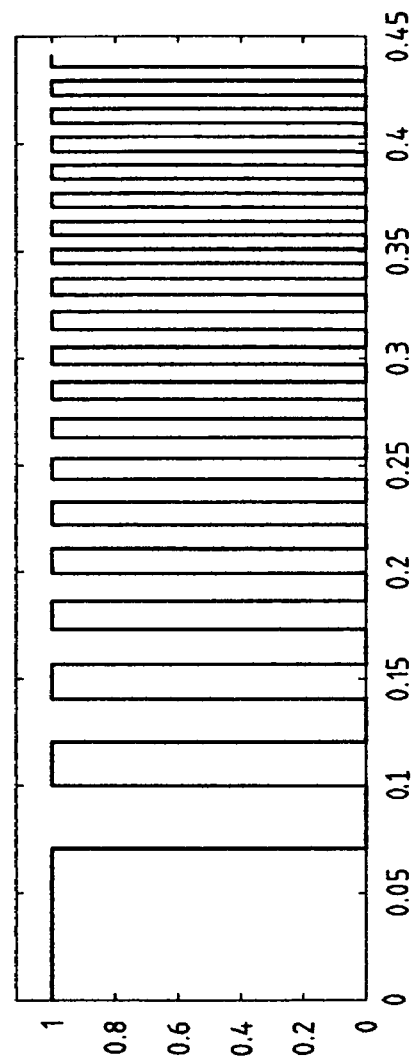

The switching times which result according to firing rule c are explained by way of FIG. 2. Firing rule c states that the voltage $U_{EMF}$ induced in the winding to be connected is located in a predefined angular range with respect to its zero-crossing, wherein the same polarity of the induced voltage and the supply voltage is assumed. This angular range may be different depending on the case of application and the motor design, and is to be selected individually. With the two-pole motor represented by way of FIG. 2, this angular range is 90° after the zero-crossing of the $U_{EMF}$ voltage. The curves A and B shown in FIG. 2a represent the polarity of the voltage $U_{EMFA}$ and $U_{EMFB}$ induced in the windings of two poles. Since it is the case of a two-pole motor and the windings of the poles are offset by 90° to one another, the angular range of 90° may be determined solely by evaluating the zero-crossings of the induced voltages in both windings, as FIG. 2a makes clear, without having to measure the angle itself. Since the windings are arranged offset to one another by 90°, on account of the geometrical relationships it results that when the induced voltage in the lagging winding B has a zero-crossing, the prior zero-crossing of the induced voltage must lie back by 90°. Thus the angular range in which the firing is to be effected according to rule c may be determined solely by detecting the successive zero-crossings of the induced voltages $U_{EMFA}$ and $U_{EMFB}$. FIG. 2a which represents the starting of the motor in a manner which is analogous to FIG. 1, illustrates that the estimation of the angular range which is taken on account of this geometric relationship is quite accurate. When the motor has departed from the low starting rotational speeds and is operated at a constant rotation speed, the desired angular range may alternatively also be determined by time measurement from the preceding period, which results from the right part of FIG. 2a. The time intervals resulting from FIG. 2a, in which a firing, i.e. a switching of the triac connecting the winding A to the supply voltage $U_V$ are effected, are indicated in FIG. 2b at 1. The triac for winding A may therefore be switched where the curve according to FIG. 2b assumes the value 1, should it be the case that firing rule c is to be observed.

FIG. 3 illustrates how the firing rule d is to be implemented. As in the previously described diagrams, time is also represented on the horizontal axis in the diagrams of FIGS. 3a, b and c. In FIG. 3a, the polarity of the supply voltage (positive at 1, negative at 0) is shown on the vertical [axis], in FIG. 3b the polarity of the voltage $U_{EMF}$ induced in the winding to be connected and in FIG. 3c the time intervals which result according to rule d in order to fire the triac of the associated winding, i.e. to connect this winding to the mains supply.

Rules d states that the triac is only to be fired when the zero-crossing of the supply voltage $U_V$ lies in front of the expected zero-crossing of the voltage $U_{EMF}$ induced in the winding to be connected, assuming the same direction, i.e. that the polarity change of the zero-crossing of the supply voltage and of the induced voltage which are to be considered are in the same direction, i.e. in both cases should run from plus to minus or also from minus to plus. Since firing rule d with respect to the zero-crossing of the supply voltage presupposes a future event which with regard to measurement technology may yet not be determined, this event must be calculated by way of preceding zero-crossings of the induced voltage, or be estimated or evaluated in another suitable manner. For this, it is useful to detect the preceding zero-crossings and on account of their distances or their distance change, to determine an expected zero-crossing, by way of which rule d may then be observed. FIG. 3c, where the curve assumes the value 1, indicates the time intervals in which a firing of the triac of the associated winding is to be effected according to rule d. As the temporal region 0.54 to 0.6 as well as 0.64 to 0.68 of the curve according to FIG. 3c illustrates, here no switching intervals result, since in these regions either the zero-crossing of the supply voltage $U_V$ does not lie in front of the expected zero-crossing of the voltage $U_{EMF}$ induced in the winding to be connected, or the direction is reversed. This limitation of the switching serves the purpose of preventing a current flow producing a negative moment.

According to rule e the firing is to be effected in a manner such that the angle between the voltage $U_{EMF}$ induced in the winding to be connected and the supply voltage $U_V$ assumes a predefined value. This rule represents a type of optimisation method and is represented by way of FIG. 4.

Figures 4A, 4B, 4C, 4D, 4E:
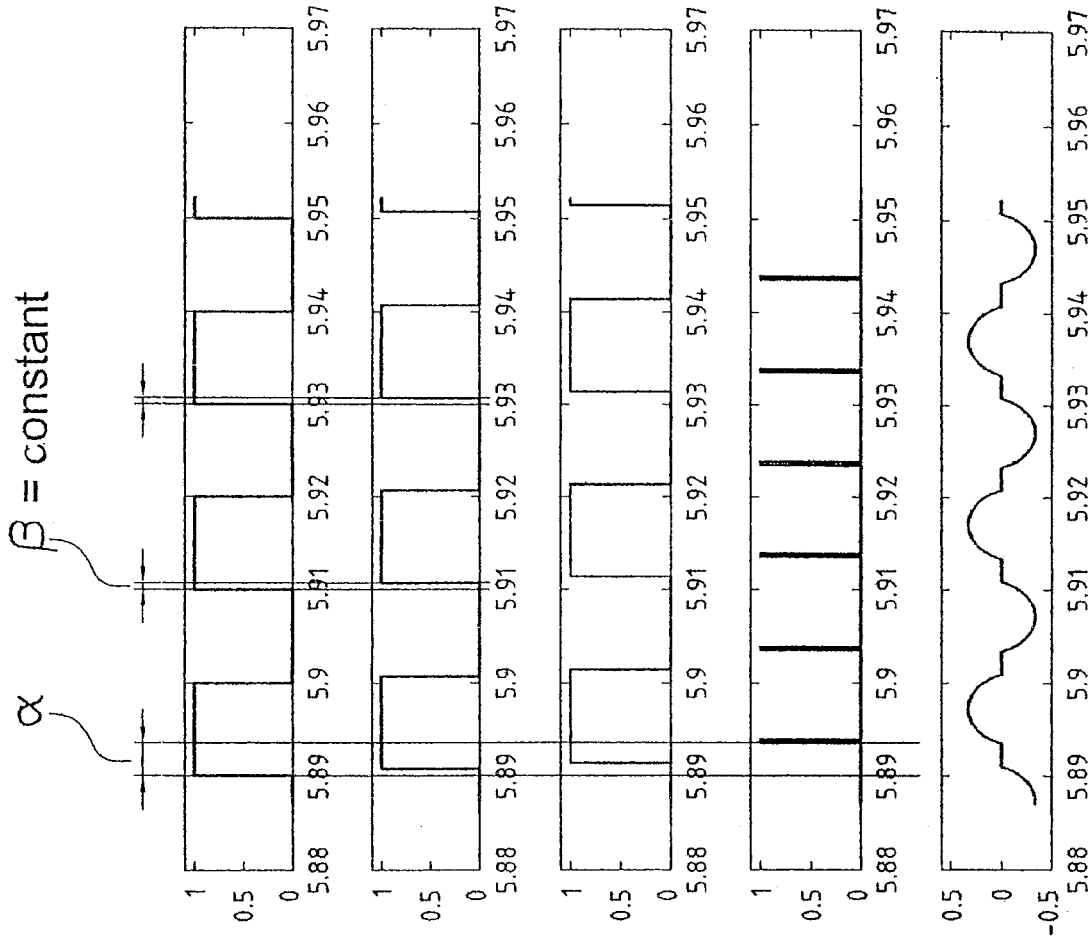

The temporal course of the polarity of the supply voltage is represented in FIG. 4a, wherein 1 represents a positive polarity and 0 a negative one. FIG. 4b represents the temporal course of the polarity of the voltage $U_{EMF}$ induced in the winding to be connected. FIG. 4c shows the temporal course of the polarity of the voltage across the switch (triac), i.e. the polarity of the voltage resulting from the supply voltage $U_V$ and the voltage $U_{EMF}$ induced in the winding to be connected. FIG. 4d shows the optimisation of the point in time of the firing which is effected according to rule e, and FIG. e the current course in the winding. According to this, the angle β between the zero-crossing of the supply voltage $U_V$ and the zero-crossing of the induced voltage $U_{EMF}$ in the winding to be connected should be constant, i.e. should correspond to a predefined value. In order to achieve this, the firing angle α calculated from the zero-crossing of the supply voltage is to be accordingly set until this angle β=constant is the case. The angle β is thus controlled with a closed loop by way of adjusting the firing angle α. The signal according to FIG. 4c is not required for these optimisation controls.

An alternative optimisation of the firing may be effected according to rule f, as is represented by way of FIG. 5a to e. Accordingly, the firing is to be effected such that the angle $T_2$ between the point in time when the current $I_W$ (see FIG. 5e) in the winding to be connected assumes the value 0 (results from FIG. 5c) up to the point in time in which the induced voltage $U_{EMF}$ in this winding assumes the value 0 corresponds to the angle $T_1$, which lies between the previous zero-crossing of the induced voltage and the current point in time of firing. The courses of the curves according to FIG. 5 illustrate this in detail, the representations according to a to c correspond to those of FIG. 4a to c, and these are referred to inasmuch as this is concerned. In this case $T_2$ is firstly to be determined and then the firing angle α is to be varied such that $T_1=T_2$, thus these angles are equally large. Alternatively one may also place a predefined relationship on these angles. These firing rules in particular serve for a smooth running of the motor and a uniform load distribution.

FIG. 6 represents an equivalent circuit diagram of a two-pole motor by way of example. The motor comprises two poles which are offset by 90° to one another, and corresponding windings A and B, wherein each of the windings A and B is connected to the supply voltage $U_V$ by way of a triac T2 and triac T3 respectively. The triacs T2 and T3 are switched according to the previously described firing rules, so that the winding A and the winding B are subjected to the supply voltage $U_V$, and specifically for so long until the current in this winding becomes zero. With the motor represented by way of FIG. 6, via a third triac T4 one may yet additionally connect a capacitor C which effects a phase shift of the windings A and B to one another. This capacitor is connected when running at a constant and synchronous rotational speed and effects a smooth, uniform and thus quiet running of the motor. One must make special provisions when connecting and disconnecting the capacitor. On connecting the capacitor it is to be ensured that the triac T3 is not connected through before the triac T4 is switched, whilst taking at least the firing rules a and b into account.

The connection of the capacitor C is thus effected when the current flowing through the triac T3 is zero since T3 is then opened. This may be detected in that either the voltage across T3 is measured or one waits for a temporal interval, for example of half a period of the supply voltage $U_V$ until T4 is switched.

With the motor represented by way of FIG. 6, the winding A is divided up into two part windings A1 and A2, wherein the part winding A2 may be activated by way of triac T1, whereas the whole winding consisting of the part windings A1 and A2 connected in series are switched by way of triac T2. The division of the winding A into part windings A1 and A2, when comparatively high operating angles result, in particular at a synchronous speed, permits a part of the winding, specifically for example the winding part A1, to be disconnected in order in this manner to achieve smaller operating angles and thus a smoother running of the motor. This measure is particularly suitable for accommodating fluctuations in the mains and inasmuch as this is concerned is not so important if a stable mains supply is ensured in another manner. In the same manner one omit the connectable capacitor C, in particular if an optimisation of the efficiency is not necessary. This also applies to switch T3 which permits a separate switching of the winding B. If a phase-angle control is not necessary for B, then this triac T3 may be omitted, but then however a supersynchronous operation of the motor is no longer possible. The switch T3 may therefore be omitted when the motor is designed only for synchronous or subsynchronous operation.

Common to all arrangements is a rotational speed control circuit R1 which activates the switches T1 to T4 and controls [with a closed-loop] the rotational speed according to the rules a to d by way of activating the switches T1 to T4 in dependence on the nominal value setting $n_{nom}$ and the electrical variable E which results from the supply voltage $U_V$ and the induced voltages $U_{EMF}$ of the individual windings or winding parts. It is indeed only possible to control a synchronous motor at practically any rotational speed by way of this control circuit R1 which applies the firing rules a to d.

A further control circuit R2 is provided in order to implement the efficiency optimisation rules e and f, which activates the switches T1 to T4 according to rules e and f as well as the rules a to d of the control circuit R1.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for continuously controlling the firing angle of a single-phase electric motor supplied with alternating current, by way of at least one locking electronic switch (T2, T3) between the supply voltage ($U_v$) and at least one motor winding (A, B), wherein the switch or switches (T2, T3) are switched according to the following conditions:
    a) the instantaneous voltage ($U_{EMK}$) induced in the winding (A, B) to be connected has the same polarity as the instantaneous supply voltage ($U_v$),
    b) the instantaneous voltage ($U_{EMK}$) induced in the winding (A, B) to be connected given the same polarity is smaller than the instantaneous supply voltage ($U_v$) with regard to magnitude, and
    c) the instantaneous voltage ($U_{EMK}$) induced in the winding to be connected, with respect to its zero-crossing, is located in a predefined angular range, assuming the same polarity of the induced voltage and the supply voltage ($U_v$), wherein the predefined angular range is determined by a time measurement in one of the previous half periods of the instantaneous voltage ($U_{EMK}$) induced in the winding (A, B) to be connected.

2. A method according to claim 1, wherein the switch or the switches (T2, T3) are switched under the further condition d), that the zero-crossing of the supply voltage ($U_v$) lies in front of the expected zero-crossing of the voltage ($U_{EMK}$) induced in the winding (A, B) to be connected assuming the same direction.

3. A synchronous motor which is supplied with alternating current in a single-phase manner, comprising a permanent magnet rotor with at least one winding (A, B) which is arranged in the stator and which may be subjected to the supply voltage ($U_v$) by way of a locking electronic switch (T2, T3) and with an electronic control circuit (R1) which controls a settable nominal rotational speed ($n_{soll}$) while applying the firing rules according to claim 2, characterized in that with regard to the control circuit, the predefined angular range is determined by a time measurement in one of the previous half periods of the voltage ($U_{EMK}$) induced in the winding (A, B) to be connected.

4. A synchronous motor according to claim 3, wherein a further control circuit (R2) is provided for the optimization of the efficiency which controls while applying the optimization rules according to the condition that the firing is effected in a manner such that the angle between the voltage ($U_{EMK}$) induced in the winding (A, B) to be connected and the supply voltage ($U_v$), assumes a predefined value, wherein the angle is selected separately for each phase in a manner which is dependent on the rotational speed, and that the firing is effected in a manner such that the angle between the point in time when the current in the winding (A, B) to be connected assumes the value zero, up to the point in time at which the induced voltage ($U_{EMK}$) in this winding (A, B) assumes the value zero, depending on the angle which lies between the previous zero-crossing of the induced voltage and the current point in time of firing.

5. A method according to claim 1, wherein the switch or the switches (T2, T3) are switched under the further condition e), that the firing is effected in a manner such that the angle between the voltage ($U_{EMK}$) induced in the winding (A, B) to be connected and the supply voltage ($U_v$), assumes a predefined value, and wherein the angle is selected separately for each phase in a manner which is dependent on the rotational speed.

6. A method according to claim 1, wherein the switch or the switches (T2, T3) are switched under the further condition f), that the firing is effected in a manner such that the angle between the point in time when the current in the winding (A, B) to be connected assumes the value zero, up to the point in time at which the induced voltage ($U_{EMK}$) in this winding (A, B) assumes the value zero, is dependent on the angle which lies between the previous zero-crossing of the induced voltage and the current point in time of firing.

7. A method according to claim 1, wherein the firing is effected such that the angle between the point in time when the current in the winding (A, B) to be connected assumes the value zero, up to the point in time at which the induced voltage ($U_{EMK}$) in this winding assumes the value zero, corresponds to the angle which lies between the previous zero-crossing of the induced voltage ($U_{EMK}$) and the current point in time of firing.

8. A method according to claim 1, wherein the voltage ($U_{EMK}$) induced in a winding (A, B), in particular its zero-crossings and its polarity, is measured with the supply voltage ($U_v$) switched off.

9. A method according to claim 1, wherein the voltage ($U_{EMK}$) induced in the winding (A, B) to be connected, in particular its zero-crossings, is determined by calculation by way of at least one sensor detecting the rotor position.

10. A method according to claim 1, wherein the zero crossing of the winding (A, B) to be connected, is detected by way of measuring the polarity change of the magnetic field of the respective phase.

11. A method according to claim 1, wherein it is detected, whether the voltage ($U_{EMK}$) induced in the winding (A, B) to be connected, given the same polarity, is smaller with regard to magnitude than the supply voltage ($U_v$), by way of measuring the voltage across the switch (12,13) of this winding (A, B), and evaluating it depending on the polarity.

12. A method according to claim 1, wherein the zero-crossings of the voltage ($U_v$) of the mains supply as well as the voltages ($U_{EMK}$) induced in the windings (A, B) are detected, and evaluated with respect to the point of time in firing by way of time measurement.

13. A method according to claim 1, wherein the predefined angular range with a four-pole motor is 90 degrees.

14. A method according to claim 1, wherein the predefined angular range is evaluated by a time measurement in the last half-period of the voltage ($U_{EMK}$) induced in the winding (A, B) to be connected.

15. The method according to claim 1, wherein a phase-shifting component (C) is connected in series to a winding (A, B).

16. The method according to claim 1, wherein at least one further locking electronic switch (T4) is provided, to which a phase-shifting component (C) may be connected.

17. The method according to claim 1, wherein a phase-shifting component is a capacitor (C), and electronic switches (T1-T4) are triacs.

18. The method according to claim 1, wherein a winding (A) is divided into two part windings (A1-A2), wherein a locking electronic switch (T1, T2) is allocated to each part winding (A1 and A2).

* * * * *